United States Patent [19]

Choi

[11] Patent Number: 5,748,402
[45] Date of Patent: May 5, 1998

[54] PINCH ROLLER DRIVING APPARATUS

[75] Inventor: Myoung-soo Choi, Anyang, Rep. of Korea

[73] Assignee: Samsung Electronics Co., Ltd., Kyungki-do, Rep. of Korea

[21] Appl. No.: 788,964

[22] Filed: Jan. 24, 1997

Related U.S. Application Data

[63] Continuation of Ser. No. 417,958, Apr. 6, 1995, abandoned.

[30] Foreign Application Priority Data

| Apr. 8, 1994 | [KR] | Rep. of Korea | 94-7334 |
| Aug. 31, 1994 | [KR] | Rep. of Korea | 94-21896 |

[51] Int. Cl.$^6$ ................................................. G11B 15/29
[52] U.S. Cl. ........................................ 360/85; 360/95
[58] Field of Search ............................ 360/84, 85, 95, 360/96.2, 96.3, 96.5, 96.6, 130.21, 130.22, 130.23, 96.4; 242/338

[56] References Cited

U.S. PATENT DOCUMENTS

| 4,616,274 | 10/1986 | Nagaoka | 360/95 |
| 4,704,643 | 11/1987 | Matsuoka et al. | 360/95 |
| 4,907,110 | 3/1990 | Ando | 360/85 |
| 4,975,793 | 12/1990 | Oka | 360/85 |
| 4,984,105 | 1/1991 | Hwang | 360/85 |
| 5,233,489 | 8/1993 | Kim | 360/95 |
| 5,430,586 | 7/1995 | Koo | 360/95 |
| 5,434,726 | 7/1995 | Song | 360/85 |
| 5,459,626 | 10/1995 | Lee et al. | 360/95 |

FOREIGN PATENT DOCUMENTS

| 61-94256 | 5/1986 | Japan . |
| 246553 | 2/1990 | Japan . |

Primary Examiner—Robert S. Tupper
Assistant Examiner—David L. Ometz
Attorney, Agent, or Firm—Sughrue, Mion, Zinn, Macpeak & Seas, PLLC

[57] ABSTRACT

A pinch roller driving apparatus of a tape cassette player, for pressing a pinch roller against a capstan shaft, is provided. The pinch roller driving apparatus has a relatively simple structure for raising and lowering the pinch roller, and for pressing it against the capstan shaft, while being ganged with a slide member which reciprocates by receiving the driving force from a loading motor. Therefore, the cost of parts is reduced, and the assembly is made easy so that the generation of inferior quality products, caused by accumulated errors during assembly, is reduced.

14 Claims, 6 Drawing Sheets

FIG.1
(PRIOR ART)
FIG.2
(PRIOR ART)
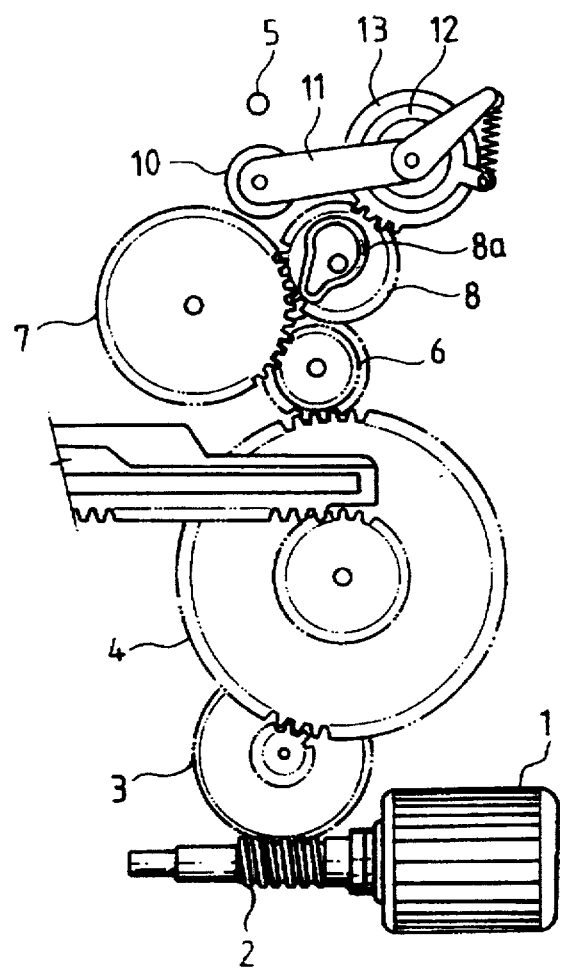
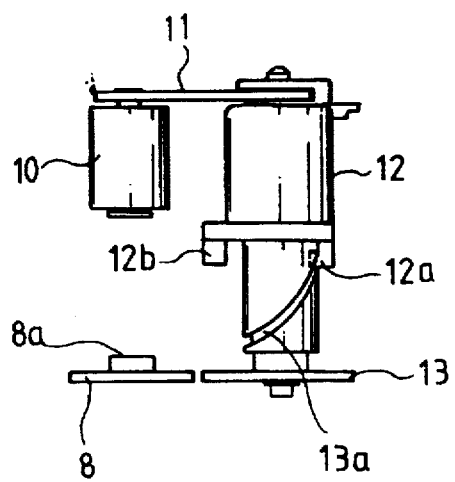

PINCH ROLLER DRIVING APPARATUS

This is a Continuation of application Ser. No. 08/417,958, filed Apr. 6, 1995 now abandoned.

BACKGROUND OF THE INVENTION

The present invention relates to a pinch roller driving apparatus for pressing a pinch roller against a capstan motor in a cassette tape player.

As is well known, according to a deck mechanism of a video tape recorder, camcoder, digital audio tape recorder and the like, a tape received on a tape cassette is released from one tape reel, travels along a plurality of guide posts, a head drum, a capstan shaft and a pinch roller and is wound around the other tape reel. For example, in a play mode, the pinch roller is pressed against the capstan shaft by a pinch roller driving apparatus and the tape is transferred at a predetermined speed by the capstan shaft and the pinch roller pressed against the capstan shaft.

The above-described deck mechanism includes a surface contact method where the pinch roller contacts the surface (recording side) of the tape and a back-side contact method where the pinch roller contacts the back side (non-recording side) of the tape. According to the deck mechanism of the back-side contact method, the pinch roller is spaced by a predetermined distance above the deck, not to interfere with the tape loading. Thus, a pinch roller driving apparatus for pressing the pinch roller against the capstan shaft while lowering the pinch roller after the tape is loaded, is needed.

As shown in FIGS. 1 and 2, a conventional pinch roller driving apparatus used in the deck mechanism of this back-side contact method has a plurality of gear members 4, 6, 7, 8 and 13 and a pinch roller 10 is lowered and pressed against a capstan shaft 5 by the interaction between the gear members 4, 6, 7, 8 and 13. That is, when a loading motor 1 rotates, a worm 2 connected to loading motor 1, a worm wheel 3 meshed with worm 2 and master gear 4 meshed with worm wheel 3 rotate. As master gear 4 rotates as above, first connection gear 6 meshed with master gear 4, second connection gear 7 meshed with first connection gear 6, cam gear 8 meshed with second connection gear 7 and third connection gear 13 meshed with cam gear 8 rotate. As a result, a rotary member 12, an arm member 11 fixed to the top of rotary member 12 and pinch roller 10 rotatably placed on arm member 11 are lowered along a spiral cam 13a of third connection gear 13.

When pinch roller is completely lowered, a cam portion 8a formed on cam gear 8 contacts a lug portion 12b of rotary member 12. Then, rotary member 12 is rotated by the rotation of cam gear 8 so that pinch roller 10 is pressed against capstan shaft 5. Reference numeral 12a is a lug portion which is formed on rotary member 12 and connected to spiral cam 13a of third connection gear 13.

However, the conventional pinch roller driving apparatus having the above structure requires a plurality of gear members for driving the pinch roller, thereby increasing the cost of parts accordingly. Also, each gear member should be exactly installed on a predetermined position so that the assembling process is difficult.

SUMMARY OF THE INVENTION

To solve the above problems, it is an object of the present invention to provide a pinch roller driving apparatus whose structure for pressing a pinch roller against a capstan shaft is simplified.

To achieve the above object, a pinch roller driving apparatus according to the present invention, for pressing a pinch roller against a capstan shaft using the revolving force of a loading motor placed on a deck, comprises: a slide member placed so as to be reciprocated by the loading motor; an arm member rotatably connected to the deck to be raised and lowered for rotatably supporting the pinch roller; ascending/descending means for raising and lowering the arm member, while being ganged with the reciprocation of the slide member; turning means for turning the arm member lowered by the ascending/descending means, while being ganged with the reciprocation of the slide member, to contact the pinch roller with the capstan shaft; and elastic means for elastically pressing the pinch roller contacted with the capstan shaft by the turning means.

BRIEF DESCRIPTION OF THE DRAWINGS

The above objects and advantages of the present invention will become more apparent by describing in detail preferred embodiments thereof with reference to the attached drawings in which:

FIG. 1 is a plan view schematically showing an example of a conventional pinch roller driving apparatus;

FIG. 2 is a side view of the pinch roller part;

DETAILED DESCRIPTION OF THE INVENTION

Figure 3:
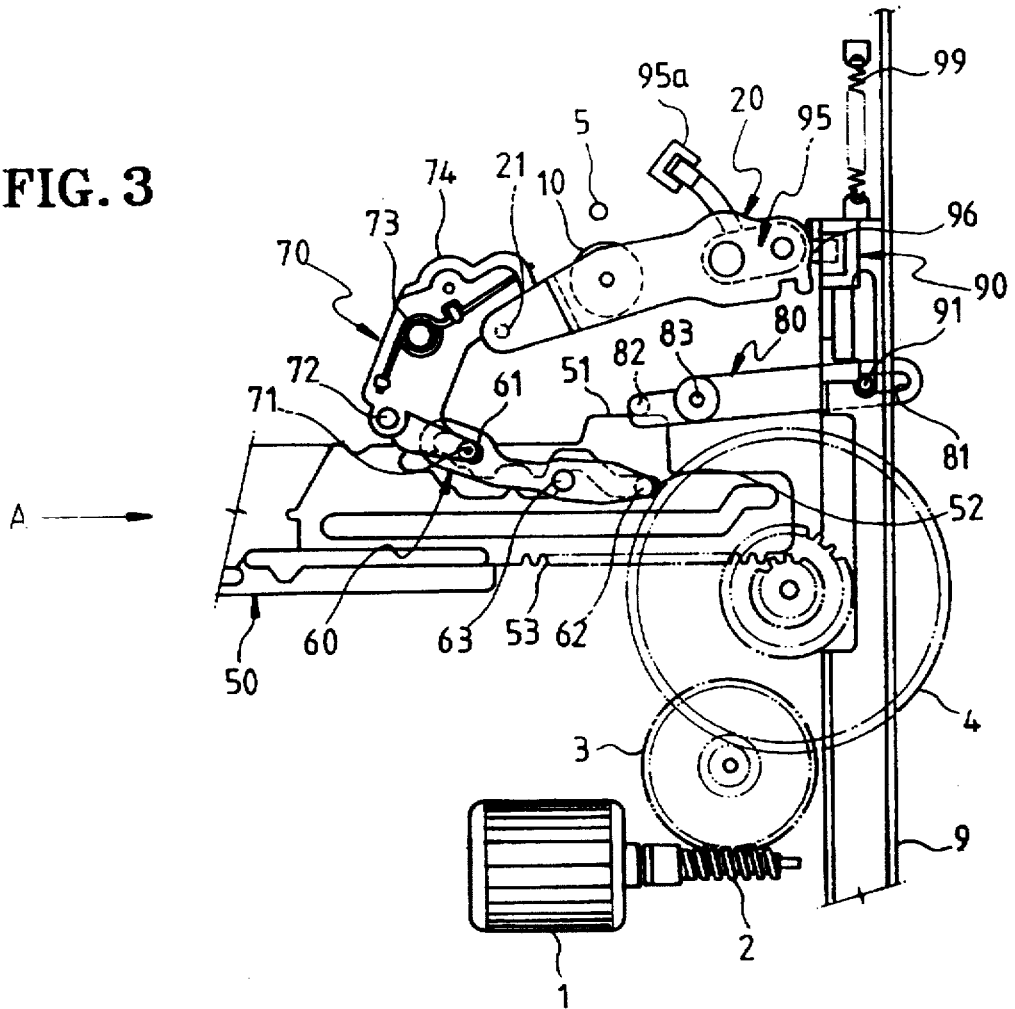
FIG. 3 is a schematic plan view when the pinch roller is raised in a pinch roller driving apparatus according to a preferred embodiment of the present invention.
Figure 4:
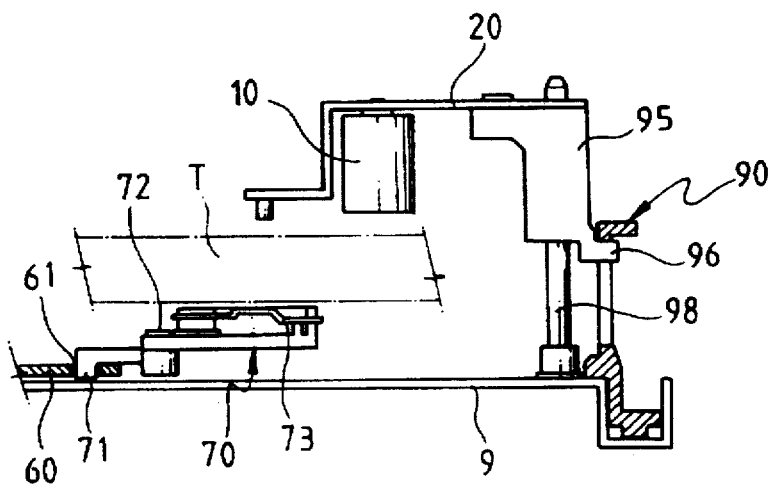
FIG. 4 is a front view of the pinch roller part shown in FIG. 3.
Figure 5:
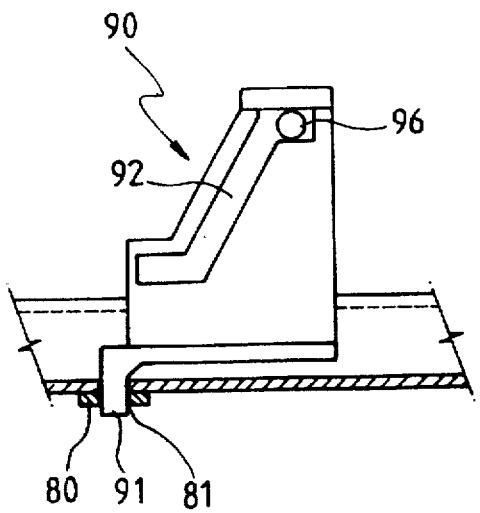
FIG. 5 is a side view of the slanted cam member shown in FIG. 3.

Referring to FIGS. 3 to 5 showing an example of a pinch roller driving apparatus according to the present invention, a worm 2 for transferring the revolving force of a loading motor 1 is coupled to the shaft of loading motor 1 and a worm wheel 3 is meshed with worm 2. A master gear 4 is meshed with worm wheel 3 and master gear 4 is meshed with a gear portion 53 of a slide member 50 placed to be reciprocated on a deck 9. Also, pinch roller 10 is rotatably supported by an arm member 20, and ascending/descending means for raising and lowering arm member 20 against deck 9, while being ganged with the reciprocation of slide member 50, is provided. Turning means is provided for turning arm member 20 lowered by the ascending/descending means, while being ganged with the reciprocation of slide member 50, to contact pinch roller 10 with capstan shaft 5. An elastic means is also provided for elastically pressing pinch roller 10 against the capstan shaft 5.

In a preferred embodiment according to the present invention, the ascending/descending means includes a first cam portion 51 formed on slide member 50, and a first lever member 80, ascending/descending member 95 and a slanted cam member 90 on deck 9.

First lever member 80 is rotatably connected by a hinge 83 on deck 9 and a guide slot 81 is formed on one end thereof. A third lug portion 82 contacting first cam portion 51 of slide member 50 is provided on the other end of the first lever member 80. First lever member 80 is elastically biased by a coil spring 99 (described later), so that third lug portion 82 contacts first cam portion 51 of slide member 50.

The ascending/descending member 95 is connected to arm member 20 and a fifth lug portion 96 is formed on the one end thereof.

Slanted cam member 90 is slidably installed on deck 9, while being ganged with the turning of first lever member 80. A fourth lug portion 91 connected to guide slot 81 of first lever member 80 is formed on one end of slanted cam member 90. A slanted cam portion 92 (see FIG. 5) which is slanted with respect to the upper surface of deck 9 and connected with fifth lug portion 96 of ascending/descending member 95 is formed on slanted cam member 90. Opposite ends of coil spring 99 are connected to slanted cam member 90 and deck 9, respectively. First lever member 80 is elastically biased so that the third lug portion 82 formed on one end of first lever member 80 contacts first cam portion 51 of slide member 50.

According to a preferred embodiment of the present invention, the turning means includes a second cam portion 52 formed on slide member 50, and a second lever member 60 and a turning member 70 provided on deck 9.

Second lever member 60 is rotatably connected on deck 9 by a hinge 63. A guide slot 61 is formed on one end of second lever member 60 and first lug portion 62 connected to second cam portion 52 of slide member 50 is formed on the other end thereof.

Turning member 70 is rotatably connected on deck 9 by hinge 72. A second lug portion 71 which is connected to guide slot 61 of second lever member 60 is placed on one end of turning member 70, for revolving turning member 70 while being ganged with the turning of second lever member 60. The other end of turning member 70 is connected to a sixth lug portion 21 which protrudes from one side of arm member 20, so that arm member 20 is rotatable while being ganged with the turning of turning member 70.

Also, a torsion spring 73 whose one side elastically contacts sixth lug portion 21 of arm member 20 is provided on turning member 70, as the elastic means.

Reference numeral 74 is a guide wall to be connected with sixth lug portion 21 of arm member 20. Reference numeral 95a is guide member for guiding the raising and lowering of ascending/descending member 95. Reference numeral 98 is a connection shaft for connecting ascending/descending member 95 with deck 9 to ascend, descend and rotate the ascending/descending member.

The operation process of the pinch roller driving apparatus having the above configuration will be described below.

First, as shown in FIG. 3, when loading motor 1 rotates in the state where the pinch roller is raised, worm 2 coupled to the shaft of loading motor 1 rotates together therewith. Also at this time, master gear 4 is rotated by worm wheel 3 meshed with worm 2. As a result, slide member 50 which is meshed with master gear 4 moves in the direction of arrow A to the state shown in FIG. 3.

In the above process, first lever member 80, which is elastically biased by coil spring 99 so that one side thereof (third lug portion 82) contacts first cam portion 51 of slide member 50, rotates about hinge 83. Revolving first lever member 80 presses fourth lug portion 91 connected to guide slot 81 thereof, so that slanted cam member 90 is slid on deck 9. This sliding of slanted cam member 90 lowers ascending/descending member 95 along connection shaft 98 since slanted cam portion 92 thereof presses fifth lug portion 96. During this process, second lever member 60 whose one side (first lug portion 62) is connected to second cam portion 52 of slide member 50 rotates centering around hinge 63. Also, turning member 70 whose one side (second lug portion 71) is connected to guide slot 61 of second lever member 60 rotates by a predetermined angle. In this state where turning member 70 rotates by the predetermined angle, arm member 20 is completely lowered so that sixth lug portion 21 of arm member 20 is connected between guide wall 74 of turning member 70 and torsion spring 73. In this state, slide member 50 continues to move so that when second lever member 60 rotates, turning member 70 rotates. At this time, arm member 20 whose sixth lug portion 21 is connected between guide wall 74 of turning member 70 and torsion spring 73 rotates toward capstan shaft 5. As a result, pinch roller 10 which is rotatably connected to arm member 20 contacts capstan shaft 5, to transfer a tape T at a predetermined speed. Here, torsion spring 73 elastically presses sixth lug portion 21 of arm member 20 so that pinch roller 10 is elastically pressed against capstan shaft 5.

In this state, when slide member 50 continues to move, first lug portion 62 of second lever member 60 moves turning member 70 back and forth through an arc, while moving along second cam portion 52. As a result, arm member 20 reciprocates back and forth and pinch roller 10 connected to arm member 20 repeats a withdrawal from and a pressing against capstan shaft 5.

On the other hand, when loading motor 1 reversely rotates, the pinch roller driving apparatus operates in the opposite sequence so that pinch roller 10 is withdrawn from capstan shaft 5 and the withdrawn pinch roller 10 is raised.

Figure 6:
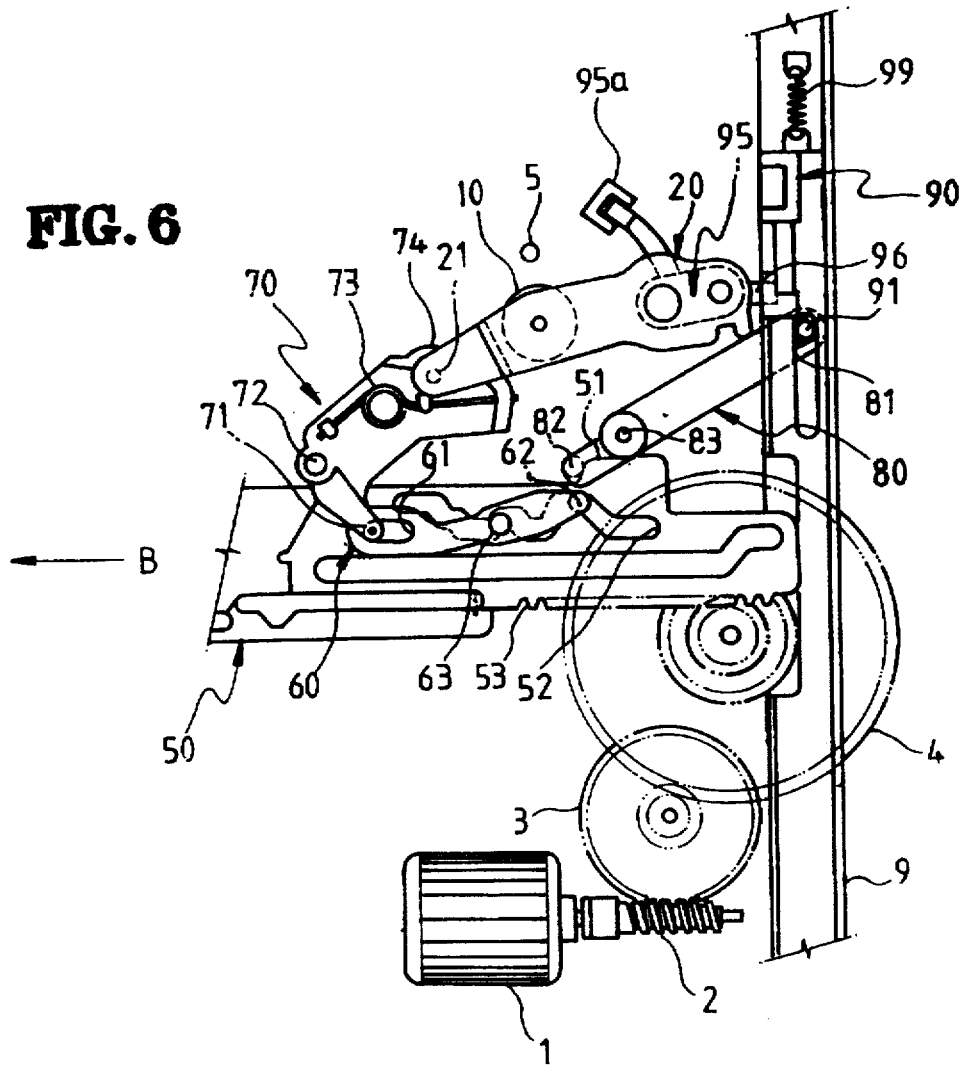
FIG. 6 is a schematic plan view when the pinch roller is lowered in the pinch roller driving apparatus shown in FIG. 3.
Figure 7:
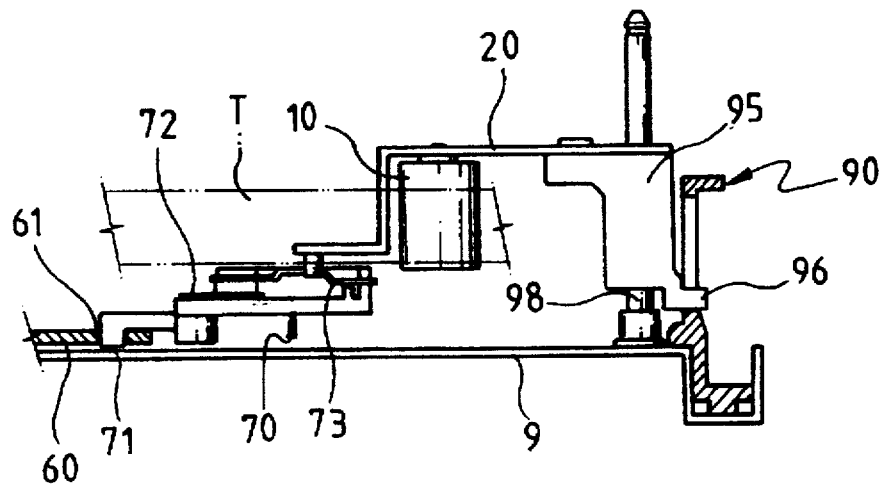
FIG. 7 is a front view of the pinch roller part shown in FIG. 6.
Figure 8:
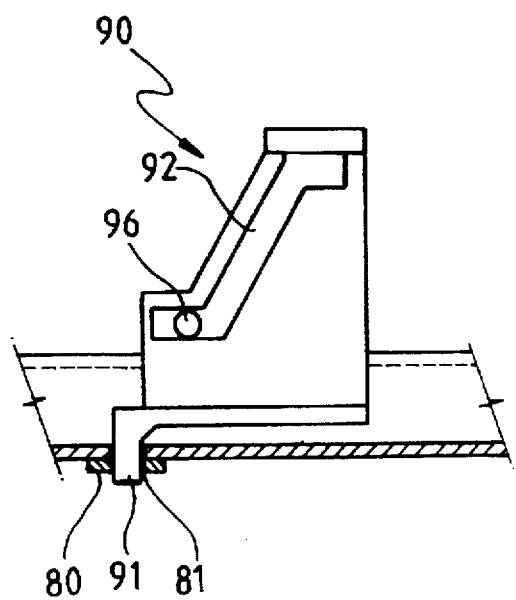
FIG. 8 is a side view of the slanted cam member shown in FIG. 6.

In the above preferred embodiment according to the present invention, in order to rotate first lever member 80 while being ganged with the reciprocation of slide member 50, first cam portion 51 is formed on slide member 50 and coil spring 99 is provided for elastically biasing first lever member 80 so that third lug portion 82 provided on one side of first lever member 80 contacts first cam portion 51 of slide member 50. As a result, when slide member 50 moves in the direction of arrow A, as shown in FIG. 3, first lever member 80 rotates counterclockwise by the restoring force of coil spring 99 and when slide member 50 moves to an arrow direction B, as shown in FIG. 6, first lever member 80 rotates clockwise while third lug portion 82 is pressed by first cam portion 51.

Figure 9:
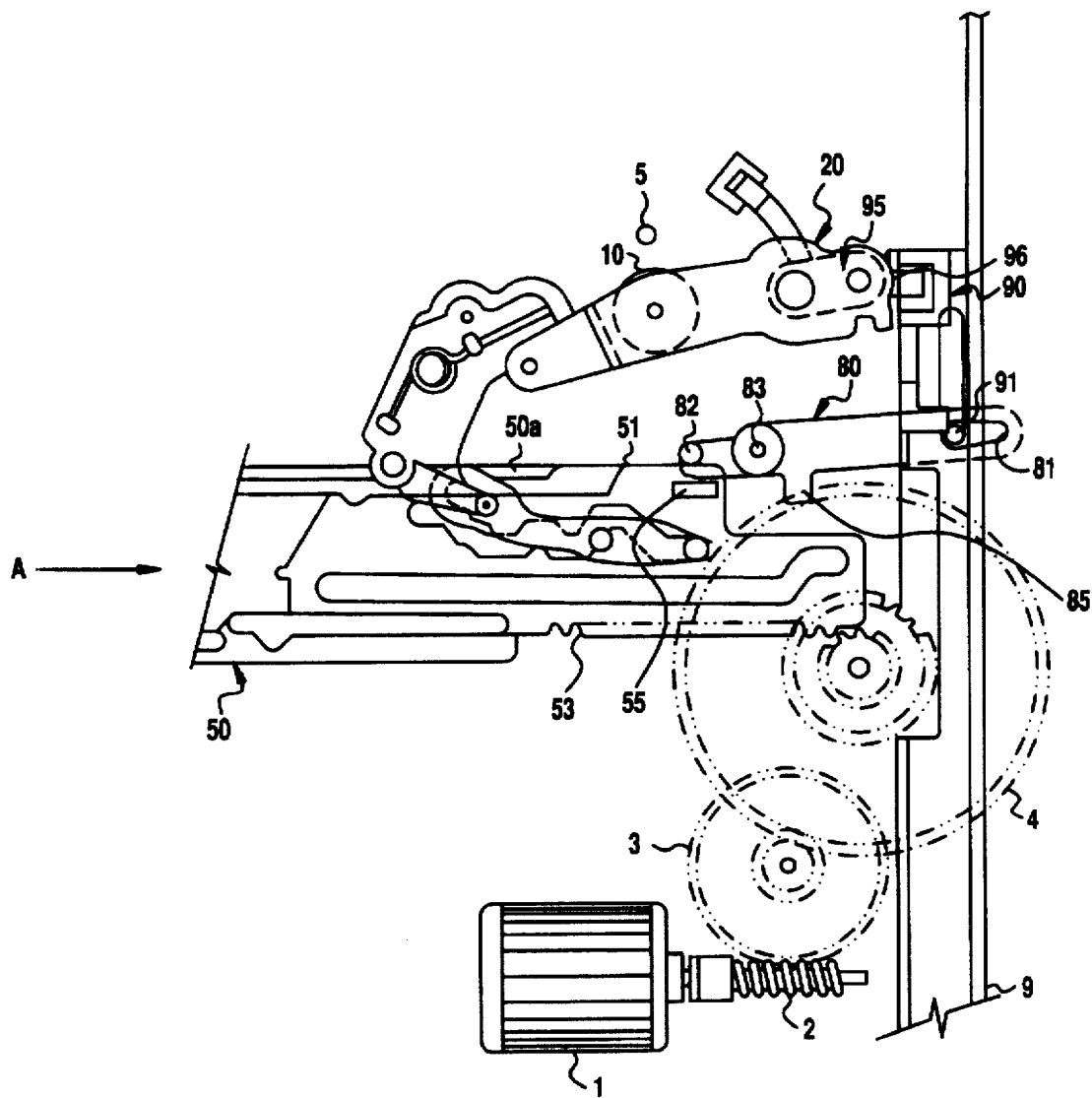
FIG. 9 is a schematic plan view when the pinch roller is raised in a pinch roller driving apparatus according to another preferred embodiment of the present invention.

However, as shown in FIG. 9, instead of the above-described coil spring 99, a retaining lug 55 may be formed on slide member 50 and a retaining jaw 85 which is pressed by retaining lug 55 of slide member 50 may be formed on first lever member 80.

Figure 10:
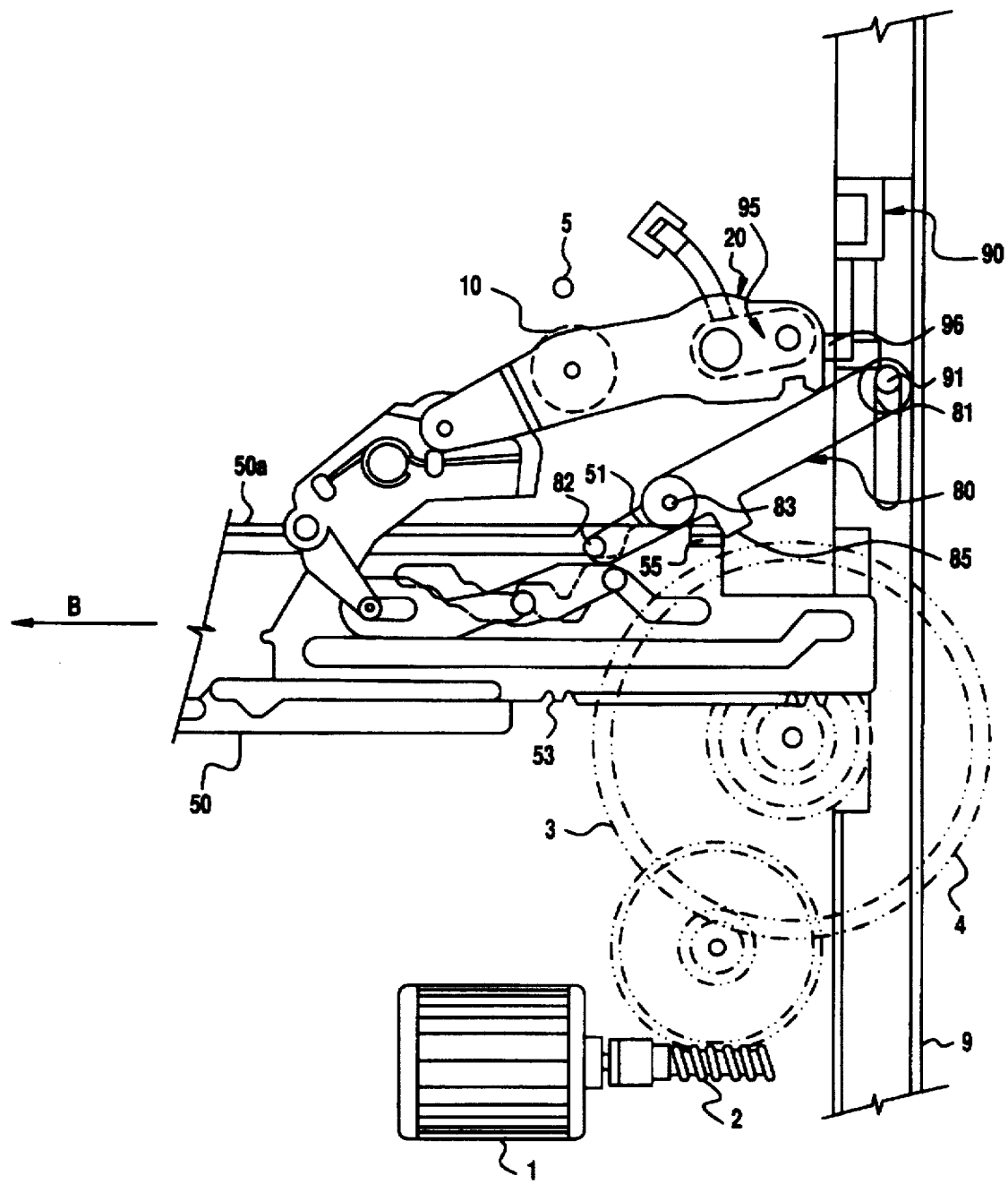
FIG. 10 is a schematic plan view when the pinch roller of FIG. 9 is lowered.

In FIG. 9, when slide member 50 moves in the direction of arrow A, retaining lug 55 of slide member 50 presses retaining jaw 85 of first lever member 80 so that first lever member 80 shown in FIG. 9 rotates counterclockwise and is in the state shown in FIG. 10. Subsequently, third lug portion 82 abuts an inner surface of dam portion 50a formed on slide member 50. As first lever member 80 rotates counterclockwise, slanted cam member 90 moves in the same manner as the above-described preferred embodiment so that arm member 20 is lowered. Also, when slide member 50 moves in the direction of arrow B as shown in FIG. 10, third lug portion 82 of first lever member 80 is pressed by first cam portion 51 of slide member 50 so that first lever member 80 rotates clockwise and is in the state where arm member 20 is raised as shown in FIG. 9.

As described above, if retaining lug 55 is formed on slide member 50 and retaining jaw 85 is formed on first lever member 80, instead of coil spring 99, the raising and lowering speed of arm member 20, that is, the raising and lowering speed of pinch roller 10, can be maintained uniformly and noise can be reduced.

As described above, the pinch roller driving apparatus according to the present invention has a relatively simple structure for raising and lowering the pinch roller, and for pressing the pinch roller against the capstan shaft, while being ganged with a slide member which reciprocates by receiving a driving force from a loading motor. Therefore, the cost of parts is reduced and assembly is made easy since the number of assembling points is reduced when each component is assembled to the deck. Also, the generation of inferior quality products, caused by accumulated errors during assembly, is reduced.

What is claimed is:

1. A pinch roller driving apparatus for pressing a pinch roller against a capstan shaft using the revolving force of a loading motor placed on a deck, comprising:

a slide member slidingly disposed on the deck to be reciprocated in a linear manner by said loading motor;

an arm member rotatably connected to the deck to be raised and lowered for rotatably supporting the pinch roller;

ascending/descending means for raising and lowering said arm member along a first direction, while being ganged with the reciprocation of said slide member;

a rotating mechanism which rotates by a predetermined angle in order to rotate said arm member lowered by said ascending/descending means, while being ganged with the reciprocation of said slide member, to move the pinch roller in a second direction that is perpendicular to said first direction to contact the pinch roller with the capstan shaft; and elastic means for elastically pressing the pinch roller contacted with the capstan shaft by said rotating mechanism.

2. A pinch roller driving apparatus as claimed in claim 1, wherein said ascending/descending means comprises:

a first cam portion formed on said slide member;

a first lever member rotatably connected to said deck and one end of which is elastically biased to contact said first cam portion;

a slanted cam member having a slanted cam portion slanted with respect to an upper surface of the deck, and connected to the other end of said first lever member to be slid on the deck, while being ganged with the turning of said first lever member; and an ascending/descending member which is fixed to said arm member and has one side inserted into the slanted cam portion of said slanted cam member.

3. A pinch roller driving apparatus as claimed in claim 2, wherein said first lever member is elastically biased by a spring whose ends are connected to said slanted cam member and said deck, so that said one end of said first lever member contacts said first cam portion of said slide member.

4. A pinch roller driving apparatus as claimed in claim 3, wherein said rotating mechanism comprises:

a second cam portion formed on said slide member;

a second lever member which is rotatably connected to the deck and has one end connected to the second cam portion of said slide member; and a rotating member which is rotatably connected to the deck, one end of said rotating member being connected to the other end of said second lever member and the other end of said rotating member being connected to said arm member, whereby the rotation of said rotating member is ganged with the rotating of said second lever member.

5. A pinch roller driving apparatus as claimed in claim 4, wherein said elastic means comprises a torsion spring which is placed on said rotating member, one side of the torsion spring being elastically contacted with said arm member.

6. A pinch roller driving apparatus as claimed in claim 2, wherein said rotating mechanism comprises:

a second cam portion formed on said slide member;

a second lever member which is rotatably connected to the deck and has one end connected to the second cam portion of said slide member; and a rotating member which is rotatably connected to the deck, one end of said rotating member being connected to the other end of said second lever member and the other end of said rotating member being connected to said arm member, whereby the rotation of said rotating member is ganged with the rotating of said second lever member.

7. A pinch roller driving apparatus as claimed in claim 6, wherein said elastic means comprises a torsion spring which is placed on said rotating member, one side of the torsion spring being elastically contacted with said arm member.

8. A pinch roller driving apparatus as claimed in claim 1, wherein said rotating mechanism comprises:

a cam portion formed on said slide member;

a lever member which is rotatably connected to the deck and has one end connected to the cam portion of said slide member; and a rotating member which is rotatably connected to the deck, one end of said rotating member being connected to the other end of said lever member and the other end of said rotating member being connected to said arm member, whereby the rotation of said rotating member is ganged with the rotating of said lever member.

9. A pinch roller driving apparatus for pressing a pinch roller against a capstan shaft using the revolving force of a loading motor placed on a deck, comprising:

a slide member placed so as to be reciprocated by said loading motor;

an arm member rotatably connected to the deck to be raised and lowered for rotatably supporting the pinch roller;

ascending/descending means for raising and lowering said arm member, while being ganged with the reciprocation of said slide member wherein said ascending/descending means comprises, a first cam portion formed on said slide member, a first lever member rotatably connected to said deck to rotate in one direction by pressing said first cam portion of said slide member, and to rotate in an opposite direction by pressing a retaining lug provided on said slide member, a slanted cam member having a slanted cam portion slanted with respect to an upper surface of the deck, and connected to an end of said first lever member to be slid on said deck, while being ganged with the turning of said first lever member, and an ascending/descending member which is fixed to said arm member and has one side inserted into the slanted cam portion of said slanted cam member;

turning means for turning said arm member lowered by said ascending/descending means, while being ganged with the reciprocation of said slide member, to contact the pinch roller with the capstan shaft; and elastic means for elastically pressing the pinch roller contacted with the capstan shaft by said turning means.

10. A pinch roller driving apparatus as claimed in claim 9, wherein said turning means comprises:

a second cam portion formed on said slide member;

a second lever member which is rotatably connected to the deck and has one end connected to the second cam portion of said slide member; and a turning member which is rotatably connected to the deck, one end of said turning member being connected to the other end of said second lever member and the other end of said turning member being connected to said arm member, whereby the rotation of said turning member is ganged with the turning of said second lever member.

11. A pinch roller driving apparatus as claimed in claim 10, wherein said elastic means comprises a torsion spring which is placed on said turning member, one side of the torsion spring being elastically contacted with said arm member.

12. A pinch roller driving apparatus for pressing a pinch roller against a capstan shaft using the revolving force of a loading motor placed on a deck, comprising:

a slide member slidingly disposed on the deck to be reciprocated in a linear manner by said loading motor;

an arm member rotatably connected to the deck to be raised and lowered for rotatably supporting the pinch roller;

ascending/descending means for raising and lowering said arm member along a first direction, while being ganged with the reciprocation of said slide member;

turning means for turning said arm member lowered by said ascending/descending means, while being ganged with the reciprocation of said slide member, to move the pinch roller in a second direction that is perpendicular to said first direction to contact the pinch roller with the capstan shaft; and elastic means for elastically pressing the pinch roller contacted with the capstan shaft by said turning means;

wherein said turning means comprises:

a cam portion formed on said slide member;

a lever member which is rotatably connected to the deck and has one end connected to the cam portion of said slide member; and a turning member which is rotatably connected to the deck, one end of said turning member being connected to the other end of said lever member and the other end of said turning member being connected to said arm member, whereby the rotation of said turning member is ganged with the turning of said lever member.

13. A pinch roller driving apparatus as claimed in claim 8, wherein said elastic means comprises a torsion spring which is placed on said turning member, one side of the torsion spring being elastically contacted with said arm member.

14. A pinch roller driving apparatus for pressing a pinch roller against a capstan shaft using the revolving force of a loading motor placed on a deck, comprising:

a slide member slidingly disposed on the deck to be reciprocated in a linear manner by said loading motor;

an arm member rotatably connected to the deck to be raised and lowered for rotatably supporting the pinch roller;

an ascending/descending mechanism for raising and lowering said arm member along a first direction, while being ganged with the reciprocation of said slide member;

a turning mechanism for turning said arm member lowered by said ascending/descending mechanism, while being ganged with the reciprocation of said slide member, to move the pinch roller in a second direction that is perpendicular to said first direction to contact the pinch roller with the capstan shaft; and an elastic mechanism for elastically pressing the pinch roller contacted with the capstan shaft by said turning mechanism;

wherein said turning mechanism comprises:

a cam portion formed on said slide member;

a lever member which is rotatably connected to the deck and has one end connected to the cam portion of said slide member; and a turning member which is rotatably connected to the deck, one end of said turning member being connected to the other end of said lever member and the other end of said turning member being connected to said arm member, whereby the rotation of said turning member is ganged with the turning of said lever member.

* * * * *